(12) United States Patent
Le Masne De Chermont

(10) Patent No.: US 7,384,046 B2
(45) Date of Patent: Jun. 10, 2008

(54) POWERED WHEELED VEHICLE CAPABLE OF TRAVELLING ON LEVEL GROUND, OVER UNEVEN SURFACES AND ON STAIRS

(75) Inventor: Hervé Marie Georges Le Masne De Chermont, Graulhet (FR)

(73) Assignee: HMCZ Developpement, Saint German en Laye (FR)

( * ) Notice: Subject to any disclaimer, the term of this patent is extended or adjusted under 35 U.S.C. 154(b) by 370 days.

(21) Appl. No.: 10/559,077

(22) PCT Filed: May 13, 2004

(86) PCT No.: PCT/FR2004/001178

§ 371 (c)(1),
(2), (4) Date: Dec. 2, 2005

(87) PCT Pub. No.: WO2004/108045

PCT Pub. Date: Dec. 16, 2004

(65) Prior Publication Data

US 2006/0124366 A1    Jun. 15, 2006

(30) Foreign Application Priority Data

Jun. 2, 2003   (FR) .................................. 03 06618

(51) Int. Cl.
*B62D 55/00* (2006.01)
*B62B 5/02* (2006.01)

(52) U.S. Cl. .................. 280/5.2; 180/9.32; 180/8.1; 180/8.2; 180/8.3; 180/7.1; 180/8.6; 180/907; 180/65.5; 180/9.34; 280/5.22

(58) Field of Classification Search ............... 180/9.32, 180/9.34, 8.1, 8.2, 8.3, 8.6, 907, 65.5; 280/5.2, 280/5.22
See application file for complete search history.

(56) References Cited

U.S. PATENT DOCUMENTS

| 4,687,068 A | * | 8/1987 | Pagett ................... 180/8.2 |
| 4,915,184 A | * | 4/1990 | Watkins .................. 180/8.2 |
| 5,996,767 A | * | 12/1999 | Misawa .................. 198/321 |

(Continued)

FOREIGN PATENT DOCUMENTS

DE        1580152 A     10/1970

(Continued)

*Primary Examiner*—Lesley D. Morris
*Assistant Examiner*—Marlon Arce-Diaz
(74) *Attorney, Agent, or Firm*—Browdy and Neimark

(57) ABSTRACT

Powered wheeled vehicle (1), capable of travelling both on level ground and over uneven surfaces, comprising at least one driving tread (BR11) as well as two pairs of front wheels (R61) and rear wheels (R21), of which at least one is a driving pair, wherein each wheel of the driving wheel pair is mounted on a swing arm, each arm of the swing arms (B21) of the rear wheels (R21) is secured to an actuator (V2) for placing said wheels in at least two positions, namely: a first lower position in which the ground-engaging surface of the wheels is below the ground-engaging surface of the tread so that said wheeled vehicle is moved by the wheels alone, and a second position in which the ground-engaging surface of the wheels remains in contact with the ground so that the vehicle is moved by a combination of the tread and said driving wheels.

15 Claims, 12 Drawing Sheets

U.S. PATENT DOCUMENTS

| | | | |
|---|---|---|---|
| 6,805,209 B2* | 10/2004 | Hedeen | 180/9.32 |
| 7,316,405 B2* | 1/2008 | Kritman et al. | 280/5.22 |
| 2002/0104692 A1 | 8/2002 | Nakatsukasa et al. | |
| 2003/0183428 A1* | 10/2003 | Hedeen | 180/9.32 |

FOREIGN PATENT DOCUMENTS

| | | |
|---|---|---|
| JP | 2003024391 | 1/2003 |
| WO | WO 94/07452 | 4/1994 |

\* cited by examiner

POWERED WHEELED VEHICLE CAPABLE OF TRAVELLING ON LEVEL GROUND, OVER UNEVEN SURFACES AND ON STAIRS

The present invention relates to a powered wheeled vehicle, capable of travelling on level ground, over uneven surfaces and on stairs.

It notably applies, but not exclusively, to the making of seats or wheelchairs for maneuvering both indoors and outdoors, this seat or chair substantially having the same functions and dimensions as a standard wheelchair and further being able to:

cross obstacles such as, for example, staircases and pavement kerbs, maneuver on difficult ground, for example loose, sandy, or stony ground, or even on soft ground.

In this type of application, more particularly, its purpose is to give back a significant portion of freedom of movement to persons having motricity difficulties (disabled persons, elderly persons) so as to improve their autonomy and to open new possibilities for them notably as regards:

vocational integration, keeping them at home, involving them in family, social and associative life.

With most of the presently marketed powered wheelchairs, it is not possible to maneuver on uneven, loose or tilted ground; for almost all of them, they do not even allow moving up onto a pavement kerb and afortiori taking a staircase.

Nevertheless, many solutions have been proposed for attempting to remedy this mobility problem on uneven ground and notably for crossing stairs.

Indeed, the provided solutions essentially relate to five families of devices:

those using simple, linked or multiple driving tracks, those using driving wheels, paired, multiple or main wheels associated with rollers, those using mixed systems, driving tracks and wheels, such as simple or multiple driving tracks and free wheels, driving tracks and driving wheels, those using tracked chassis transporting unpowered wheelchairs, those using systems comprising driving wheels associated with supporting bars.

Except for certain proposed solutions which have been the object of marketed achievements, most of them have not succeeded, for reasons of bulkiness, safety, design complexicity and implementation costs, and notably because of unsatisfactory control of the transition between the steps of the staircase and the ground uphill or downhill from said staircase, or of the transition of the same nature between the pavement kerb and the ground uphill or downhill from said kerb.

More particularly, the object of the invention is therefore to solve these problems and to suppress these drawbacks by controlling in real time the transition between an edge (pavement kerb or other edge) or a step (first step or last step of a staircase) and the ground uphill or downhill from said edge or from said step.

As said transition is the limiting profile between two plane surfaces, the real time control of such a transition may obviously be applied to uneven (stony or other) ground.

For this purpose, the invention proposes a powered wheeled vehicle, capable of travelling both on level ground and on over surfaces, comprising at least one driving tread as well as two pairs of front and rear wheels, at least one of which is a drive, each of these wheels with the driving torque being mounted on a rocker arm which may pivot around an axis parallel to the axis of the wheel and perpendicularly to the longitudinal axis of the tread, characterized in that each of the rocker arms of the rear wheels with the aforesaid driving torque is securely attached to an actuator designed so as to position said wheels in at least two positions, i.e.: a first low position wherein the supporting area of the wheels is located below the supporting area of the treads so that the wheels by themselves provide driveability of said wheeled vehicle, and a second position wherein the supporting area of the wheels remains in contact with the ground so that the driveability of the vehicle results from the combination of the effects of the tread and of said driving wheels.

With this solution, it is notably possible to guarantee an almost continuous displacement velocity when crossing the transition consisting of an edge and of ground uphill or downhill from said edge, the transition between the first step and the last step of a staircase and the ground associated with said step, or the transition from one step to the next of a staircase.

An embodiment of the invention will be described hereafter, as a non-limiting example, with reference to the appended drawings wherein.

Figure 1:
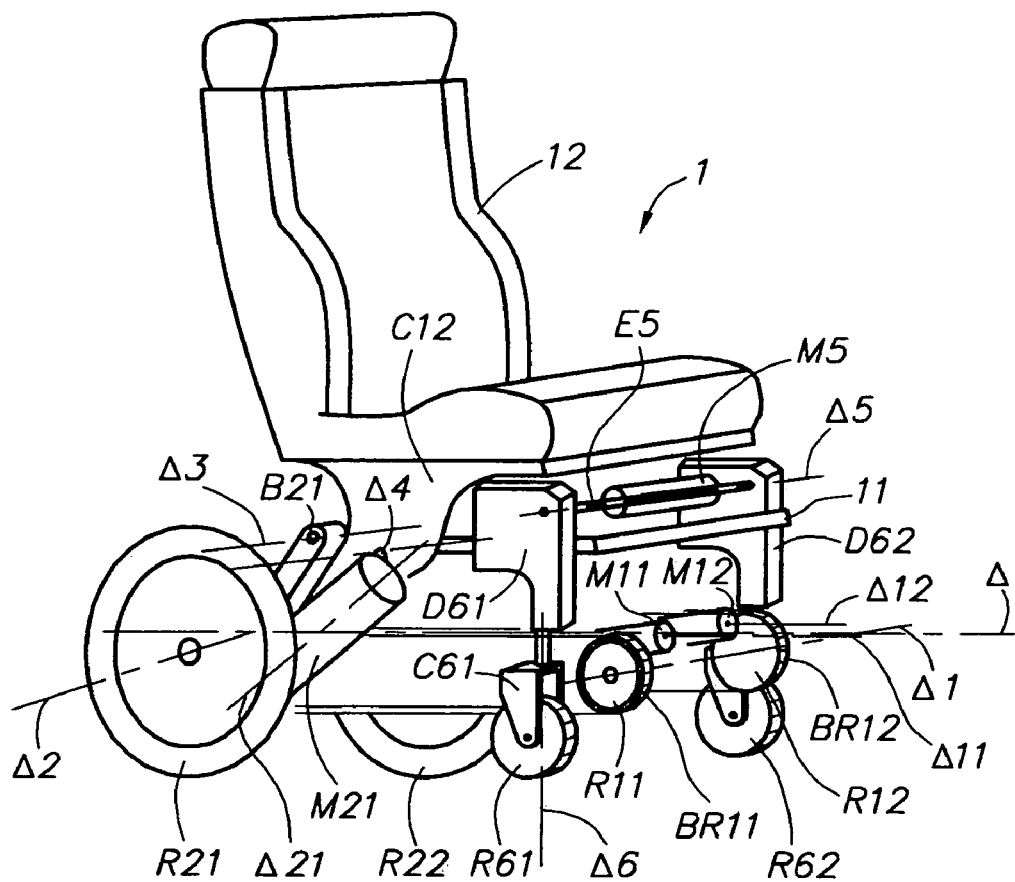
FIG. 1 illustrates a perspective view of the vehicle, moving on a horizontal ground, in the driveability position on wheels.
Figure 2:
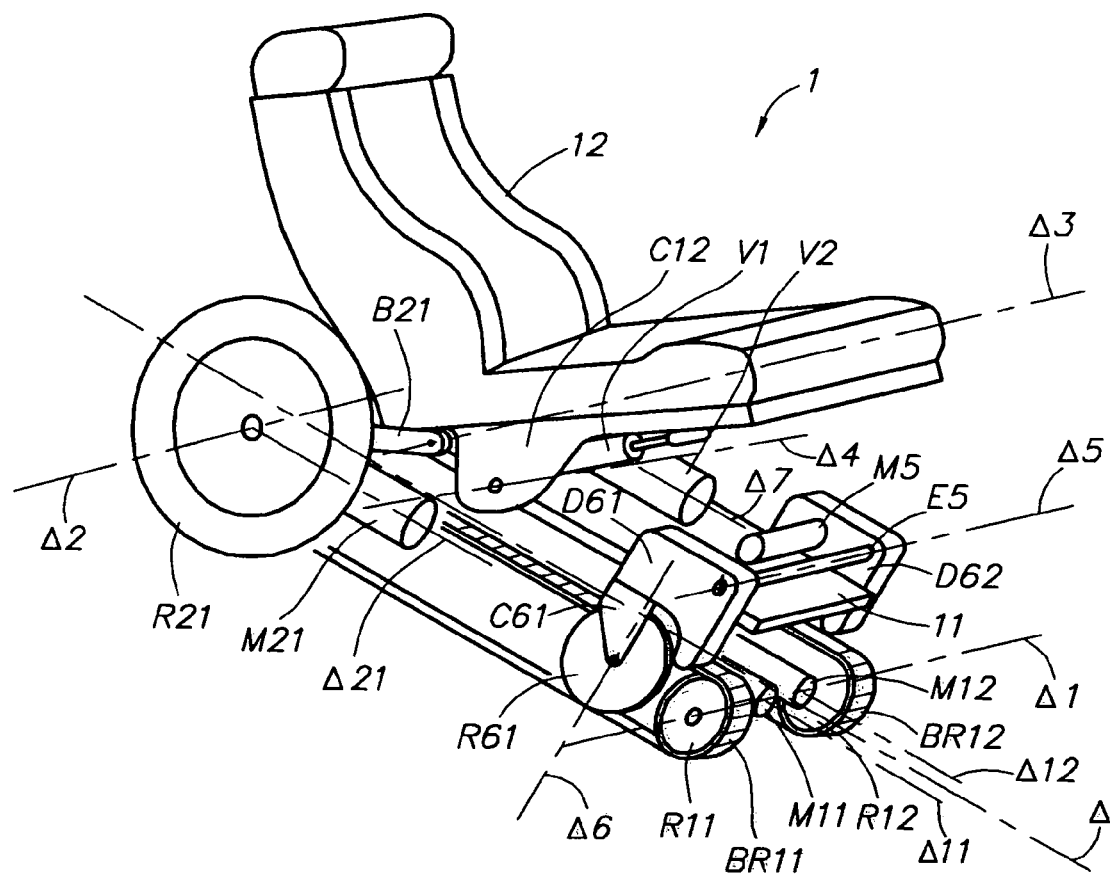
FIG. 2 illustrates a perspective view of the vehicle, moving on a tilted ground, in a driveability position on treads.

The references of the various components forming the powered wheeled vehicle are identical in the different FIGS. 1-11; FIGS. 1 and 2, illustrating the vehicle in a perspective view, comprise the totality of the references; nevertheless some of them are visible in FIG. 2 and not in FIG. 1, and vice versa.

As indicated in FIGS. 1 and 2, the vehicle 1 consists of a platform 11 supporting the seat 12 and the whole of the mechanical locomotion units; the standard units for this type of vehicle are not illustrated, i.e., the control console, the electrical power supply batteries, as well as the electronic module, associated with sensors.

The locomotion units comprise:

two treads BR11 and BR12 located on either side of a longitudinal axis Δ; said treads are supported by rollers R11, R12 at the front of the vehicle, and rollers R11', R12' (not shown in FIGS. 1, 2) at the rear of the vehicle; the aforesaid front rollers are rotatably mounted around an axis Δ1, perpendicular to the longitudinal axis Δ, in a plane parallel to the plane defined by the platform 11; the same applies for the aforesaid rear rollers, pivoting around an axis Δ1' (not shown), perpendicular to the longitudinal axis Δ, in a plane parallel to the plane defined by the platform 11; the distance between said axes Δ1 and Δ1' is adjustable so as to allow for changes in the supporting length of the aforesaid treads BR11, BR12; the powering of the tread BR11, supported by rollers R11, R11', is provided by an electric gear motor M11; also the powering of the tread BR12, supported by the rollers R12, R12', is provided by an electrical gear motor M12; both of these gear motors, securely attached to the platform 11, are positioned on either side of the longitudinal axis Δ, along axes Δ11, Δ12, respectively, parallel to the longitudinal axis Δ;

a pair of rear driving wheels R21 and R22, rotatably mounted around an axis Δ2, perpendicular to the longitudinal axis Δ, in a plane parallel to the plane defined by the platform 11; each of the wheels R21, R22 is powered via electric gear motors, M21, M22, respectively, positioned in the gap formed by the driving wheel and the adjacent tread; moreover, a hub of the wheel R21 (not shown), with which the gear motor M21 is associated, is securely attached to a rocker arm B21; said arm R21 is pivotally mounted around an axis Δ3, perpendicular to the longitudinal axis Δ, in a plane parallel to the one defined by the platform 11; the same applies for wheel R22, the hub of which is associated with a gear motor M22, securely attached to a rocker arm B22, pivotally mounted around Δ3; components R22, M22, B22 are not shown; the motion of the rocker arms B21, B22, is provided by an electric actuator V2, securely attached to the platform 11, located along an axis Δ7, parallel to the longitudinal axis Δ;

a pair of front wheels R61 and R62, rotatably mounted around a horizontal axis, contained in a plane parallel to the plane defined by the platform 11; each of the wheels R61, R62, is supported by a clevis, C61, C62, respectively (not shown), said devises are pivotally mounted around an axis perpendicular to the plane defined by the platform 11, i.e., Δ6, Δ6', respectively (not shown); moreover each of the devises C61, C62, is securely attached to a device D61, D62, respectively, associated with platform 11, allowing the aforesaid devises C61, C62 to be moved by means of a driving shaft E5 and of an electric gear motor M5, so that their respective axes Δ6, Δ6' move in a plane perpendicular to the platform 11, and advantageously held perpendicular to said platform, on either side of the longitudinal axis Δ; the driving shaft E5 is pivotally mounted around an axis Δ5, perpendicular to the longitudinal axis Δ, in a plane parallel to the plane defined by the platform 11.

The seat 12 is securely attached to the platform 11 via a clevis C12, allowing the seat 12 and clevis C12 assembly to pivot around an axis Δ4, perpendicular to the longitudinal axis Δ, in a plane parallel to the plane defined by the platform 11; the pivoting motion of the seat 12 and clevis C12 assembly is provided by an electric actuator V1, securely attached to the platform 11 on the one hand, via a joint not shown, and to the clevis C12, via another joint not shown, on the other hand.

As shown in FIG. 1, with the vehicle 1 moving over a horizontal ground, in the driveability position on wheels, the aforesaid driving rear wheels R21, R22 and the aforesaid front wheels R61, R62 are positioned in contact with the ground, the aforesaid treads BR11, BR12 are positioned away from the ground.

As shown in FIG. 2, with the vehicle 1 moving on tilted ground, in the driveability position on tread surfaces, the aforesaid treads BR11, BR12, are positioned in contact with the ground, the aforesaid driving rear wheels, R21, R22 and the aforesaid front wheels R61, R62 are positioned away from the ground.

The following FIGS. 3-11 are schematic illustrations of the respective positions of the front and rear wheels, and of the tread according to different ground configurations; the seat 12, the longitudinal axis Δ, the tread BR11 supported by the rollers R11, R11', the rear wheel R21, the front wheel R61, the rocker arm B21 pivoting around the Δ3, are shown in most of the figures, the ground is referenced by the symbol S.

Figure 3:
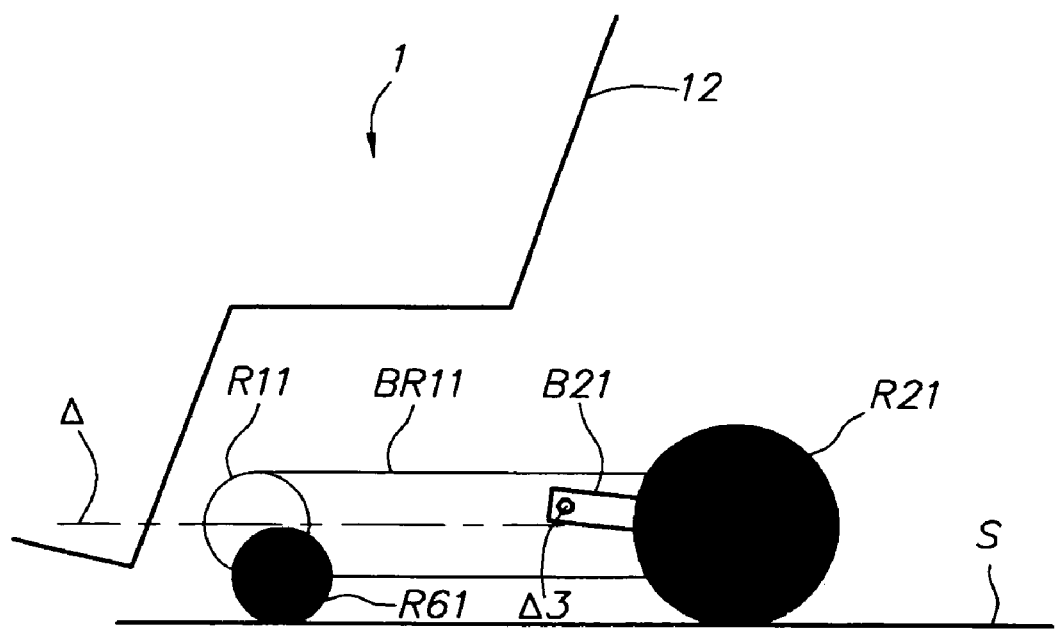
FIG. 3 illustrates the respective position of the front and rear wheels, and of the tread while moving on wheels.

In the driveability position on wheels, as shown in FIG. 3, the rear wheels R21 and the front wheels R61 are in the low position and rest on the horizontal ground S; thus the tread BR11, supported by the rollers R11, R11', is away from the horizontal ground S.

The seat 12 is positioned so that the bearing surface is located in a plane parallel to the ground S.

As an indication, the bearing surface of the tread BR11, is at a distance of 10 cm from the ground S; the bearing surface of the seat 12 is at a distance of 54 cm from the ground S.

Figure 4:
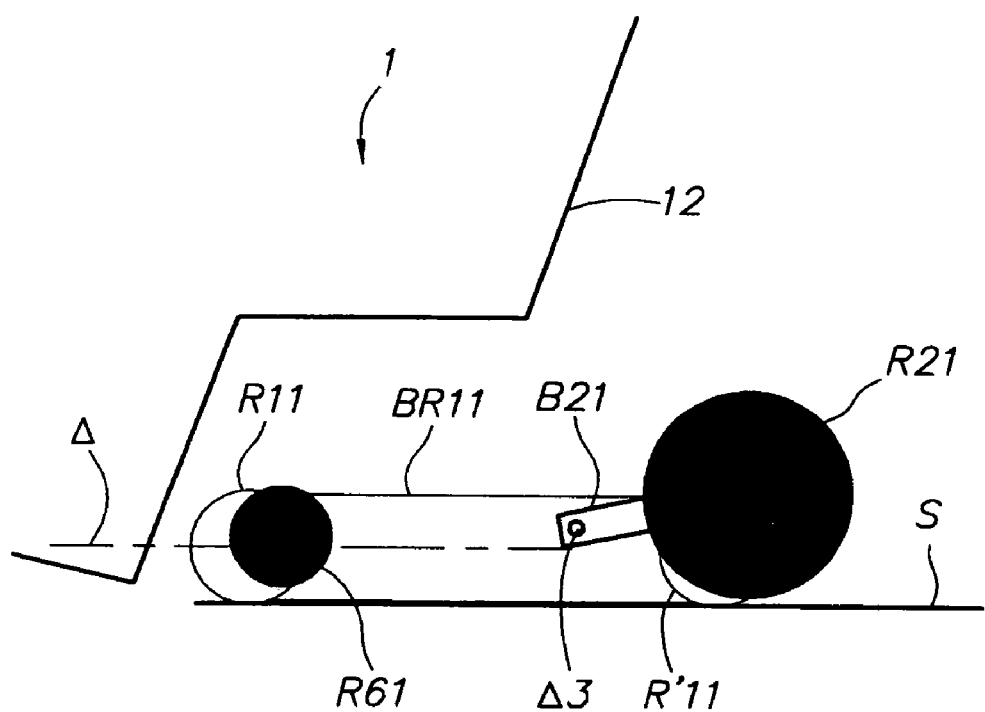
FIG. 4 illustrates the perspective position of the front and rear wheels and of the tread while moving on the tread.

In the driveability position on tread surfaces, as indicated in FIG. 4, the tread surface BR11, supported by the rollers R11, R11', rests on the ground S; thus, the rear R21 and front R61 wheels are in the high position and are away from the horizontal ground S.

The seat 12 is positioned so that the bearing surface is located in a plane parallel to the ground S.

As an indication, the bearing surfaces of the rear R21 and front R61 wheels are at a distance of 4 cm from the ground S; the bearing surface of the seat 12 is at a distance of 44 cm from the ground S.

Figure 5:
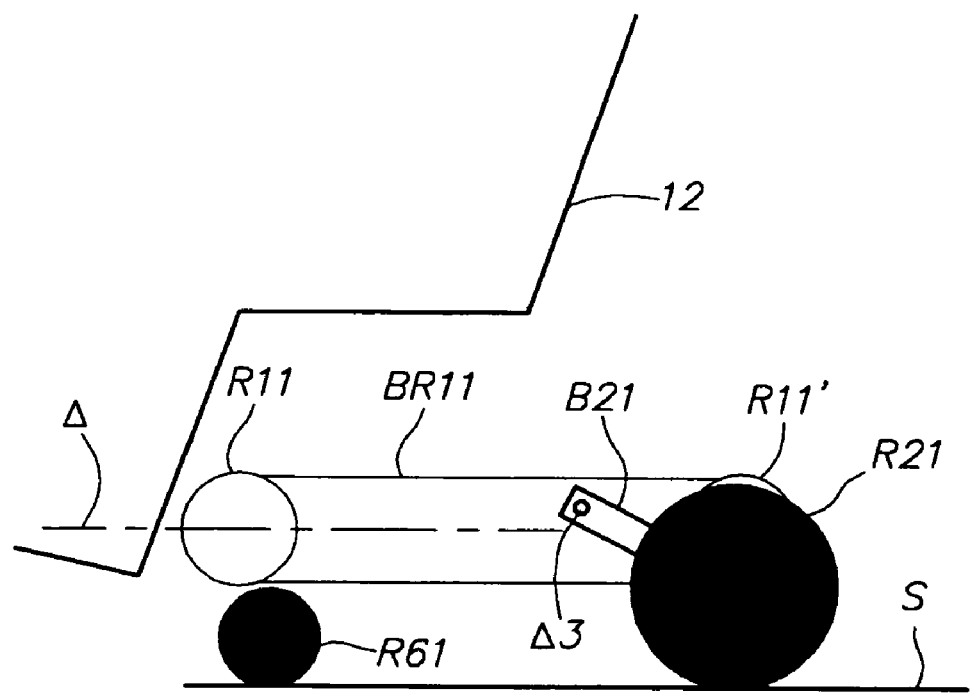
FIG. 5 illustrates the respective position of the front and rear wheels and of the tread while moving on wheels in a raised situation.

In the raised driveability position on wheels, as indicated in FIG. 5, the rear R21 and front R61 wheels are in the very low position and rest on the horizontal ground S; thus the tread BR11 supported by the rollers R11, R11', is particularly distant from the horizontal ground S.

The seat 12 is positioned so that the bearing surface is located in a plane parallel to the ground S.

As an indication, the bearing surface of the tread BR11 is distant from the ground S, by more than 16 cm; the bearing surface of the seat 12 is distant from the ground S, by more than 60 cm.

With this so-called raised position, it is possible to reduce the wheel base between the front wheel R61 and the rear wheel R21 and to thereby make the vehicle easier to handle, given that the turning radius is smaller.

Generally, crossing a staircase is carried out in reverse gear to climb up it, and in forward gear to climb down it, the vehicle being designed so that the vertical projection of the centre of gravity of the whole, consisting of the person sitting on the vehicle and of the vehicle itself, is contained in the bearing surface of said vehicle on the steps of the staircase, defined as being the surface inscribed within a contour, which contour is determined by the external limits of the treads on the one hand, and the uphill and downhill generatrices defined by the step edges.

Figure 6A:
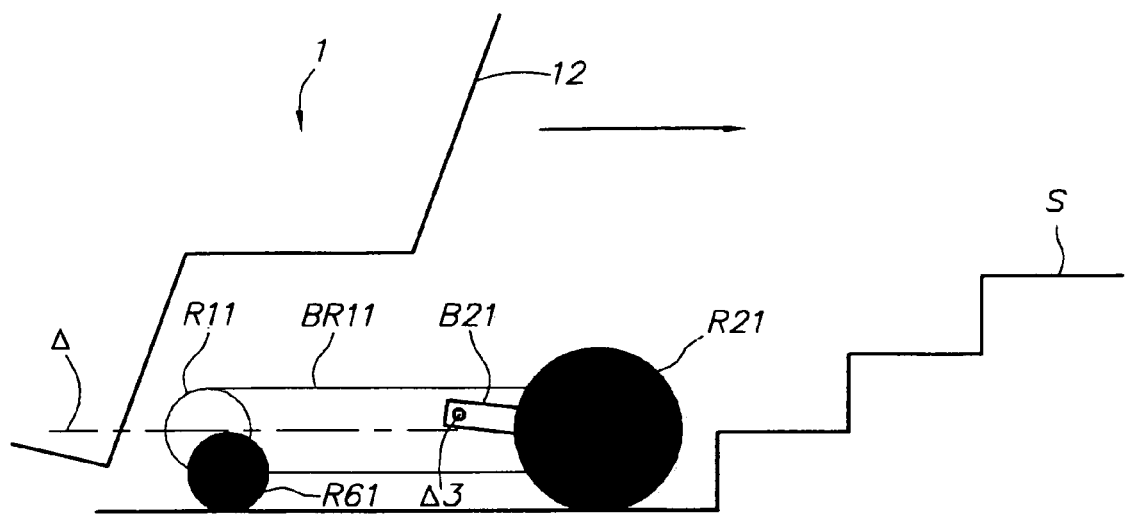
FIGS. 6a, 6b illustrate the respective position of the front and rear wheels and of the tread while moving up the first steps of a staircase.
Figure 6B:
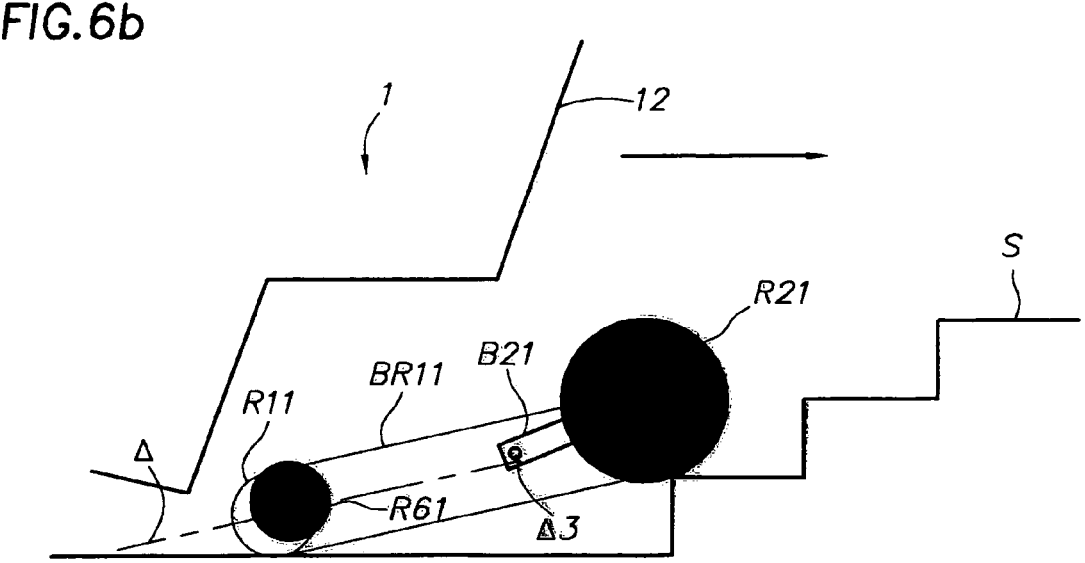

Upon climbing up a staircase, the transition between horizontal ground and the first step of staircase, carried out in reverse gear as shown in FIGS. 6a, 6b, is achieved according to the following steps:

positioning the vehicle in abutment against the first step,
upward motion of the front R61 and rear R21 wheels,
having the tread BR11 rest against the ground,
having the rear wheel R21 rest against the horizontal plane of the first step,
simultaneous starting of the tread BR11 and of the rear wheel R21.

It should be noted that the bearing surface of the rear wheel R21 in the high position, is tangent to the bearing surface defined by the tread BR11, so as to cooperate with the movement for crossing the first step of the staircase.

Moreover, the seat 12 gradually pivots backwards under the action of the actuator V1, in order to maintain the bearing surface of the seat 12 in a horizontal plane.

The sequence of operations, as mentioned earlier, may be carried out manually by the person using the vehicle, or advantageously by a controller taking into account the information from the position, proximity and tilt sensors and acting on the gear motors M21, M22, actuating the rear wheels R21, R22, on the gear motors M11, M12, actuating the treads BR11, BR12, on the actuator V2 actuating the arms B21, B22, on the gear motor M5 actuating the translational movement of the front wheels R61, R62, and on the electric actuator V1 actuating the seat 12.

Crossing a staircase is carried out, as indicated earlier in reverse gear for climbing up and in forward gear for climbing down.

Figure 7:
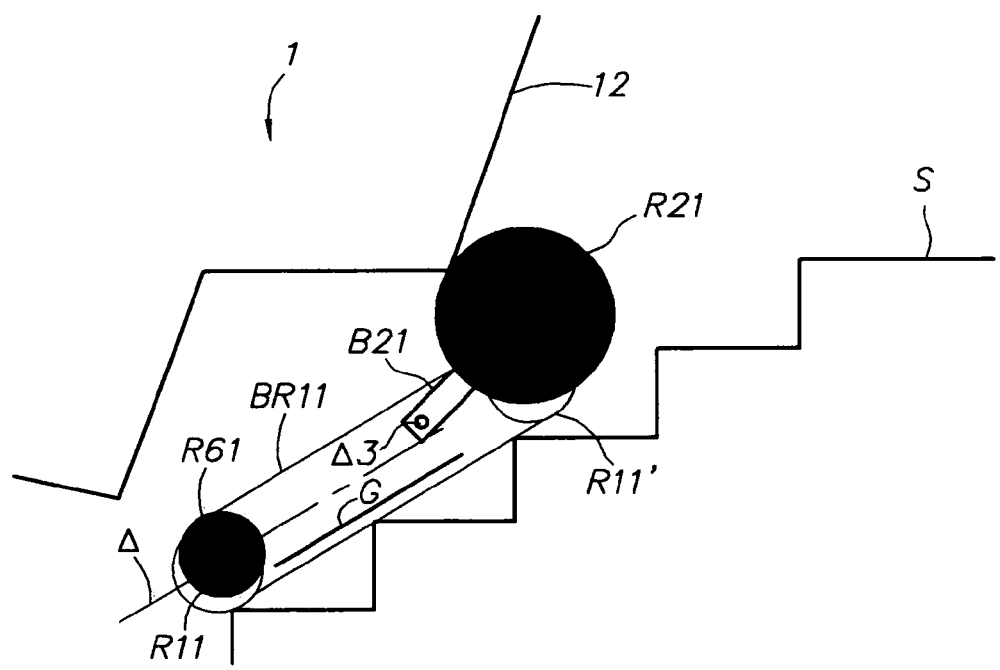
FIG. 7 illustrates the respective position of the front and rear wheels and of tread while moving up or down a staircase.

In this case, locomotion of the vehicle is carried out by the treads, as indicated in FIG. 7.

The rear R21 and front R61 wheels are lifted in such a way that the tread BR11, supported by the rollers R11, R11', may rest on the steps of the staircase at the edges of said step.

It should be noted that the distance which separates said rollers R11, R11' is such that the tread generally rests on at least three consecutive step edges; this in order to allow displacement of the vehicle without any jolts; the setting-up of slides (G), along the treads, positioned parallel to the bearing surface, on the side opposite to said bearing surface, will contribute to uniformizing the translational movement of the vehicle; also, the positioning of the rear wheel R21 so that it rests tangentially on the step edge during its crossing, will also contribute to uniformizing the translational movement of the vehicle.

Moreover, the seat 12 will be pivoted backwards under the action of the actuator V1 so as to maintain the bearing surface of the seat 12 in a horizontal plane.

The sequence of operations, as mentioned earlier, may be manually carried out by the person using the vehicle, or advantageously, by a controller taking into account the information from the sensors and acting on the different gear motors and actuators defined earlier.

Figure 8:
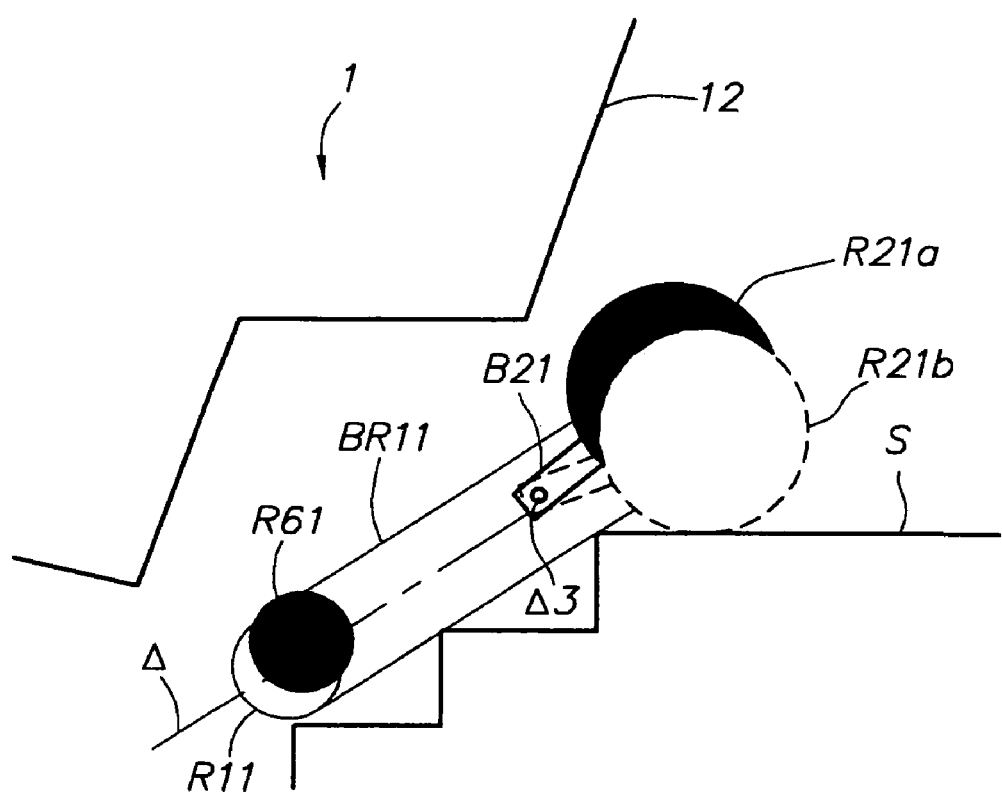
FIG. 8 illustrates the respective position of the front and rear wheels and of the tread while moving up the last steps of a staircase.

Upon climbing up the last steps, as indicated in FIG. 8, as the number of step edges on which rests the tread BR11, decreases, the rear wheel R21 is gradually lowered so as to rest on the ground S forming the upper horizontal plane of the last step.

Thus, pivoting the vehicle backwards, upon crossing the last edge or the last but one step edge, is avoided; continuity of the translational movement of the vehicle is provided.

The rear wheel R21, becoming a driving wheel, will contribute to the driveability generated by the tread BR11.

Moreover, the seat 12 gradually pivots forwards under the action of the actuator V1, in order to maintain the bearing surface of the seat 12 in a horizontal plane.

The sequence of operations, as mentioned earlier, may be manually carried out by the person using the vehicle, or advantageously by the controller taking into account information from the sensors and acting on the different gear motors and actuators as defined earlier.

Figure 9A:
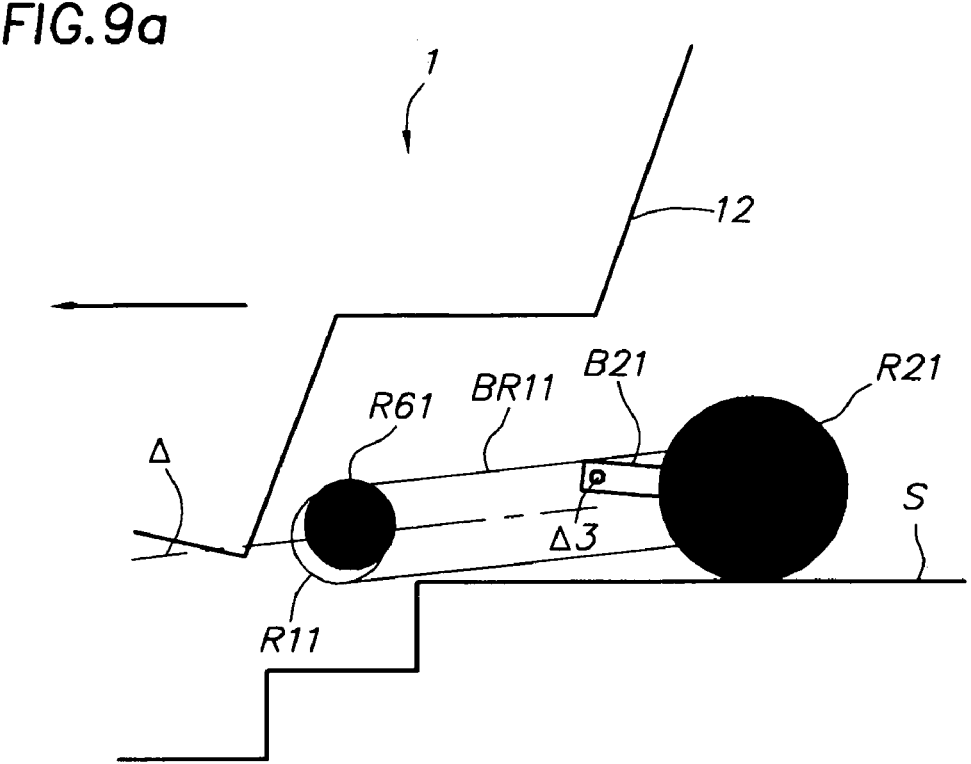
FIGS. 9a, 9b illustrate the respective position of the front and rear wheels and of the tread while moving down the first steps of a staircase.
Figure 9B:
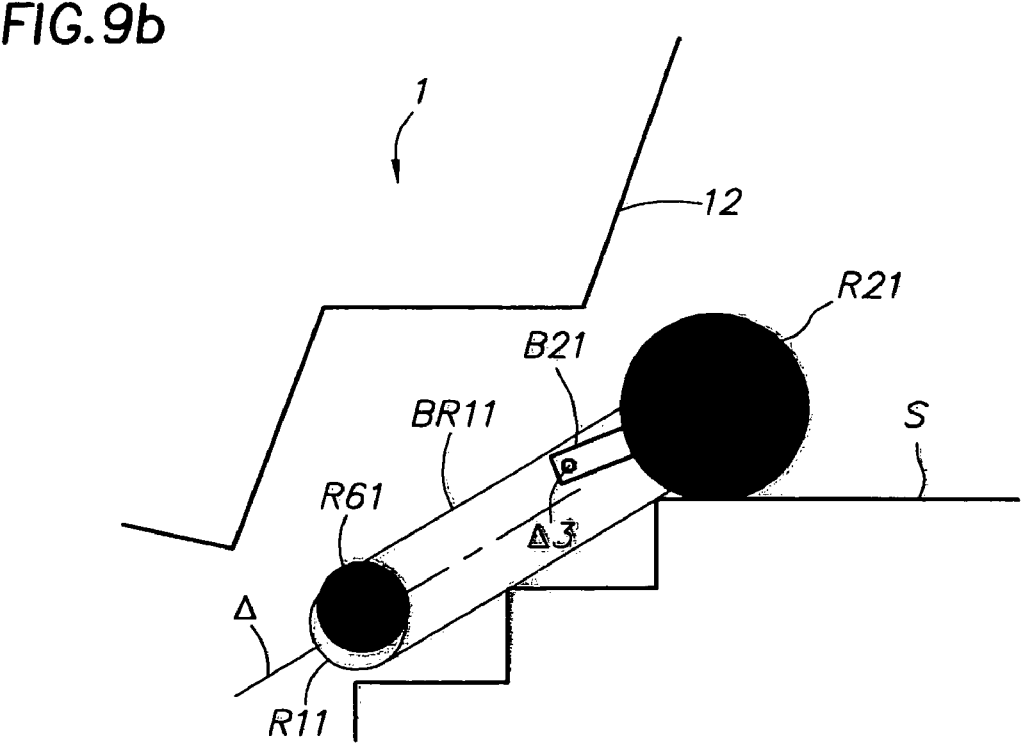

Upon moving down a staircase, the transition between horizontal ground and the first step of a staircase, carried out in forward gear as indicated in FIGS. 9a, 9b, is achieved according to the following steps:

positioning the vehicle at the edge of the first step,
upward motion of the front wheel R61,
having the tread BR11 rest on the ground,
having the rear wheel R21 rest with the horizontal plane of the ground corresponding to the upper surface of the first step,
starting the tread BR11 and possibly the rear wheel R21.

It should be noted that the bearing surface of the rear wheel R21, in the high position, is tangent to the bearing surface defined by the tread BR11, so as to cooperate with the movement for crossing the first steps of the staircase.

Moreover, the seat 12 gradually pivots backwards under the action of the actuator V1, in order to maintain the bearing surface of the seat 12 in a horizontal plane.

The sequence of operations, as mentioned earlier, may be manually carried out by the person using the vehicle, or advantageously by a controller taking into account information from the sensors and acting on the gear motors and actuators as defined earlier.

Figure 10A:
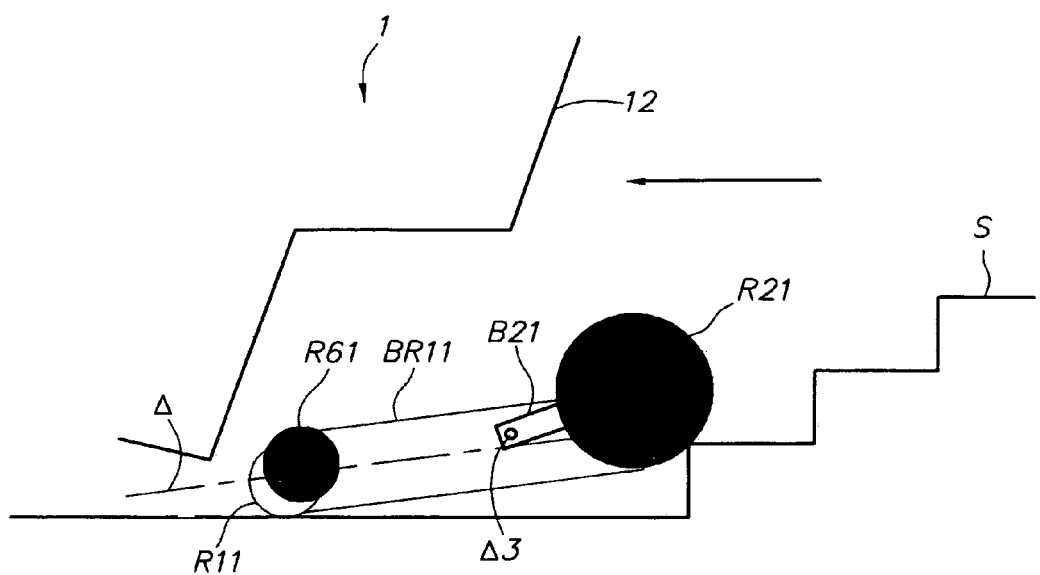
FIGS. 10a, 10b, illustrate the respective position of the front and rear wheels and of the tread while moving down the last steps of a staircase.
Figure 10B:
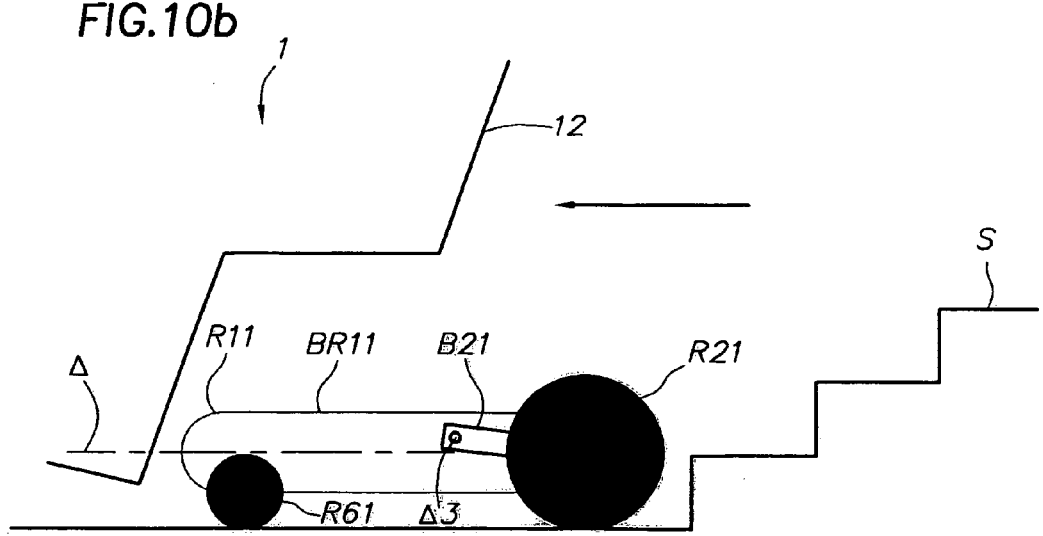

Upon moving down a staircase, the transition between the last step of a staircase and the ground, carried out in forward gear as indicated in FIGS. 10a, 10b, is achieved according to the following steps:

having the tread BR11 rest on the horizontal ground S,
having the rear wheel R21 rest on the horizontal plane corresponding to the upper surface of the last step and then of the horizontal ground S,
lowering the front wheel R61 so as to rest on the horizontal ground S,
stopping the drive of the tread surface,
starting the rear wheel R21.

It should be noted that the rear wheel R21, in the high position, rests on the edge of the last step and then gradually comes to rest on the ground, in order to cooperate with the movement for crossing the last steps of the staircase.

Moreover, the seat 12 gradually pivots backwards under the action of the actuator V1, in order to maintain the bearing surface of the seat 12 in a horizontal plane.

The sequence of operations, as mentioned earlier, may be manually carried out by the person using the vehicle, or advantageously by a controller taking into account the information from the sensors and acting on the gear motors and actuators as defined earlier.

Figure 11:
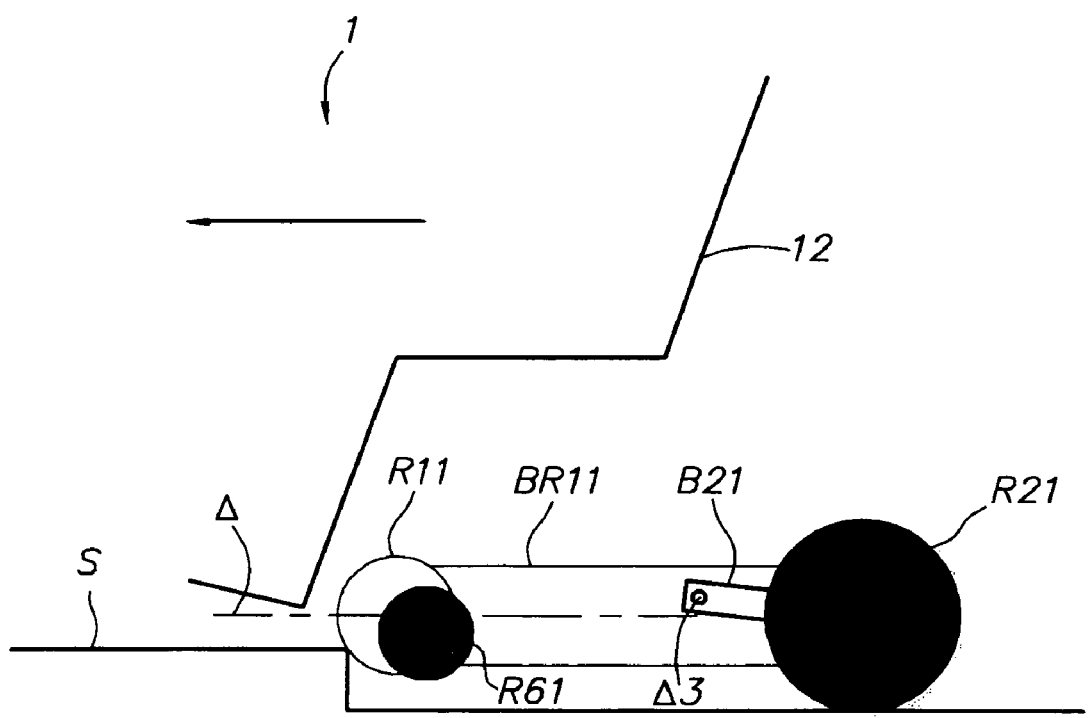
FIG. 11 illustrates the respective position of the front and rear wheels and of the tread while crossing a low height obstacle.

Upon crossing a low height obstacle, such as a single step or a pavement kerb, the transition between the uphill ground and the downhill ground of said obstacle carried out in forward gear as indicated in FIG. 11, is achieved according to the following steps:

positioning the vehicle at the obstacle,
upward motion of the front wheel R61,
having the tread BR11 rest on the horizontal ground S, uphill from the obstacle,
driving the tread BR11, crossing the obstacle by the driveability of the tread BR11, having the tread BR11 rest on horizontal ground S, downhill from the obstacle, having the rear wheel R21 rest on the horizontal ground S, downhill from the obstacle, lowering the front wheel R61 so as to rest on the horizontal ground S downhill from the obstacle, stopping the drive of the tread BR11, starting the rear wheel R21.

It should be noted that the rear wheel R21, in the low position, rests on the horizontal ground S, uphill from the obstacle, and then gradually comes to rest on the horizontal ground S, uphill from the obstacle, in order to cooperate with the movement for crossing the obstacle.

Moreover, the seat 12 may possibly oscillate around the axis Δ4 under the action of the actuator V1, so as to maintain the bearing surface of the seat 12 in a horizontal plane, upon crossing the obstacle.

The sequence of operations, as mentioned earlier, may be manually carried out by the person using the vehicle, or advantageously by a controller taking into account the information from the sensors and acting on the gear motors and actuators as defined earlier.

Crossing the transition between steps of a staircase and the uphill or downhill ground of said staircase, moving up or down said staircase, or crossing a low height obstacle, carried out sometimes in forward gear sometimes in reverse gear, requires that the steps defined earlier be observed.

As indicated above, the operations for lowering or raising the front R61 and rear R21 wheels, starting or stopping the drive of the tread BR11 and of the rear wheel R21, control of the actuator V1 of the seat 12, may be manually carried out by the person using the vehicle or advantageously via a controller controlling the motor units according to elementary commands delivered by the user of the vehicle and to information from suitable sensors.

Indeed, the user of the vehicle may have a control console comprising:

standard units associated with this type of powered wheeled vehicle, on the one hand, i.e.:
  a joystick with three degrees of freedom so as to be able to move forwards, backwards, turn left or right, accelerate or slow down,
  a general on/off switch,
  a battery charge indicator,
  a displacement speed indicator,
units specific to the vehicle according to the invention, on the other hand, i.e.:
  a power module for controlling the gear motors M11, M12 driving the treads BR11, BR12,
  a power module for controlling the actuator V2 driving the arms B21, B22,
  a power module for controlling the gear motor M5 displacing the front wheels R61, R62,
  a power module for controlling the actuator V1 displacing the seat 12,
  a plurality of sensors for sensing proximity, distance to the ground, tilt of the platform and position of the wheels relatively to the platform,
  a selection switch for automated functions: "up a staircase", "down a staircase", "flat ground", "stony ground", "obstacle", "emergency stop",
  a computer taking into account the function selected by the user of the vehicle and the information from the different sensors and controlling in real time the different power modules mentioned earlier.

According to an alternative of the invention, the control console may comprise the switch for selecting automated functions ("up a staircase", "down a staircase", "flat ground", "stony ground", "obstacle", "emergency stop"), and/or a plurality of units for manually controlling the power modules (gear motors M11, M12, M5 and actuators V1, V2).

According to another alternative of the invention, the horizontal position servo-control of the seat 12, along the longitudinal axis Δ, may be carried out automatically with reference to a tilt sensor, attached to the seat.

Figure 12:
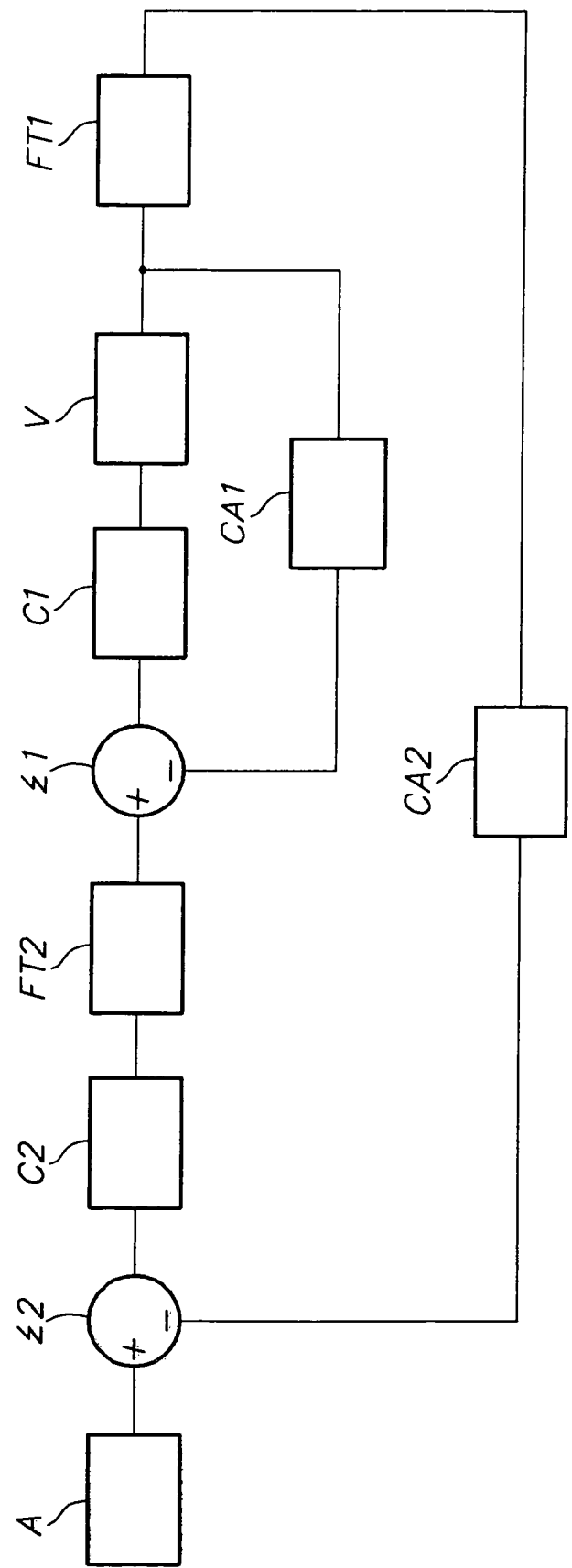
FIG. 12 illustrates the block diagram of the position servo-control of the seat 12.

Indeed, as indicated in FIG. 12, the horizontal position servo-control of the seat 12, may comprise:
  a first servo-control loop of the cylinder comprising in this order: the actuator V1, an incremental sensor of the actuator's elongation CA1, a corrector of the PID (proportional, integral, derivative) type C1, and an adder Σ1,
  a second servo-control loop for the actuator V1 comprising in this order, at the output of said first loop: a transfer function module FT1, a tilt sensor CA2, and adder Σ2, a PID type corrector C2 and a transfer function module FT2, the output of which is connected to the input of the adder Σ1 of the first loop,
  a set tilt value display A connected to the input of the adder Σ2 of said second servo-control loop.

The first loop enables the position of the actuator V1 to be servo-controlled, whatever the change in the stress applied on said actuator, i.e., regardless of the weight of the user of the vehicle; with the PID type corrector C1, it is possible to avoid travel overshoots of the actuator around the controlled position.

The second loop containing the first loop and the tilt sensor, enables the position of the seat 12 to be servo-controlled according to the tilt of said seat and to the travel of the actuator V1; with the second PID type corrector C2, it is possible to avoid travel overshoots around the set point defined by the display A; said set point display A enables the tilt of the seat to be defined, i.e., 0° or possibly another value for reasons of comfort; the transfer function modules FT1, FT2, convert the "linear displacement" date into "angular displacement" data and the "angular displacement" data into "linear displacement" data, respectively.

According to another alternative of the invention, the horizontal position servo-control of the seat 12 may be carried out automatically with reference to a tilt sensor, so as to maintain said seat 12 horizontal along a transverse axis, perpendicular to the longitudinal axis Δ; the servo-control, as described earlier, maintains by means of the actuator V1, the seat 12 in the horizontal position against the pitching effect of the platform 11; the second servo-control, along a transverse axis, maintains, by means of a actuator V3 not shown, the seat in the horizontal position against the rolling effect of the platform 11. Advantageously, the servo-control will be of the same type as the one described earlier in connection with actuator V1.

According to another alternative of the invention, the plurality of sensors defined above may further comprise a viewing camera directed towards the ground, associated with a module for real time processing of the viewed image. This assembly, comprising the camera and the processing module, may, via the computer onboard the vehicle, servo-control the movement of the gear motors M11, M12, for driving the treads BR11, BR12, in order to correct the trajectory of the vehicle upon crossing a staircase, or even control in real time the crossing of a curved staircase.

According to another alternative of the invention, the plurality of sensors defined above may further comprise an adjustable viewing camera associated with a viewing screen so that the user of the vehicle may better appreciate the nature and the dimensions of the obstacles which have to be crossed in order to improve his/her autonomy while guaranteeing his/her safety.

The invention claimed is:

1. A powered wheeled vehicle, capable of travelling both on level ground and over uneven surfaces, comprising two driving treads supported by two rollers located at the front of the vehicle and two rollers located at the rear of the vehicle as well as two pairs of front and rear wheels, one of which is a drive, each of these wheels with the driving torque being mounted on a rocker arm which may pivot around an axis parallel to the axis of the wheel and perpendicular to the longitudinal axis of the tread, each of the rocker arms of the rear wheels of the aforesaid driving torque being securely attached to an actuator designed so as to position said wheels in a first low position wherein the supporting area of the wheels is located below the supporting area of the treads so that the wheels by themselves provide the driveability of said wheeled vehicle, wherein said actuator is designed so as to position the wheels in a second high position wherein the supporting area of the wheels remains in contact with the ground so that the driveability of the vehicle results from the combination of the effects of the tread and said driving wheels, said vehicle comprising a controller taking into account information from position, proximity, and tilt sensors, and acting on the gear motors actuating the rear wheels, on the gear motors, actuating the treads, on the electric actuator actuating the arms, on the gear motor actuating the translational movement of the front wheels, and on the electric actuator actuating the seat so as to allow a transition to be carried out in reverse gear, between horizontal ground and the first step of the staircase, upon moving up a staircase, including the following steps:
   positioning the vehicle in abutment against the first step,
   upward motion of the front and rear wheels,
   having the tread rest on the ground,
   having the rear wheel rest against the horizontal plane of the first step,
   simultaneous starting of the tread surface and of the rear wheel,
the bearing surface of the rear wheel in the high position, being tangent to the bearing surface defined by the tread, so as to cooperate with the movement for crossing the first step of the staircase.

2. The powered wheeled vehicle according to claim 1, wherein the front wheels are supported by devises, which are securely attached to devices enabling the aforesaid clevises to be moved in a vertical plane by means of a drive shaft and an electric gear motor.

3. The powered wheeled vehicle according to claim 1, wherein both pairs of front and rear wheels are positioned in a very low position so as to reduce the wheel base between the aforesaid pairs of front and rear wheels.

4. The powered wheeled vehicle according to claim 1, wherein the treads are supported by rollers and by rollers, respectively.

5. The powered wheeled vehicle according to claim 1, wherein the rollers and the rollers are driven by the gear motors, respectively.

6. The powered wheeled according to claim 1, wherein the distance which separates the on the one hand, and the rollers on the other hand, is variable so that the aforesaid treads rest on a variable bearing surface.

7. The powered wheeled vehicle according to claim 1, wherein the rear wheels are driven by electric gear motors, respectively.

8. The powered wheeled vehicle according to claim 1, wherein a seat is adjustable around an axis, perpendicular to the longitudinal axis and is actuated by an electric actuator.

9. The powered wheeled vehicle according to claim 1, comprising:
   a power module for controlling the gear motors driving the treads,
   a power module for controlling the electric actuator driving the arms,
   a power module for controlling the gear motor displacing the front wheels,
   a power module for controlling the electric actuator displacing the seat,
   a plurality of sensors sensing proximity, distance to the ground, tilt of the platform, and the position of the wheels relatively to the platform,
   a switch for selecting automated functions: "up a staircase", "down a staircase", "flat ground", "stony ground", "obstacle", "emergency stop",
   a computer taking into account the function selected by the user of the vehicle and the information from the different sensors and controlling in real time the different power modules.

10. The powered wheeled vehicle according to claim 1, comprising at least one horizontal position servo-control for the seat including:
   a first servo-control loop of the actuator comprising in this order: the electric actuator or the electric actuator, an incremental sensor for sensing the elongation of the actuator, a corrector of the PID (proportional, integral, derivative) type, and an adder,
   a second servo-control loop for the electric actuator or the actuator comprising in this order, at the output of said first loop: a transfer function module, a tilt sensor, an adder, a PID type corrector and a transfer function module, the output of which is connected to the input of the adder of the first loop,
   a set tilt value display connected to the input of the adder of said second servo-control loop.

11. The powered wheeled vehicle according to claim 1, wherein the plurality of sensors further comprises a viewing camera directed towards the ground, associated with a module for processing in real time the viewed image providing servo-control of the movement of the gear motors driving of the treads, via the computer onboard the vehicle, correction of the trajectory of the vehicle upon crossing a staircase, or even real-time control of the crossing of a curved staircase.

12. The powered wheeled vehicle according to claim 11, wherein the plurality of sensors further comprises an adjustable viewing camera associated with a viewing screen so that the user of the vehicle may better appreciate the nature and the dimensions of the obstacles which have to be crossed.

13. The powered wheeled vehicle according to claim 1, wherein the aforesaid controller is designed so as to provide the carrying out in forward gear, of a transition between the ground and the first step of the staircase, upon moving down from a staircase, including the following steps:
   positioning the vehicle at the edge of the first step,
   upward motion of the front wheel,
   having the tread rest on the ground, having the rear wheel rest with the horizontal plane of the ground corresponding to the upper surface of the first step, starting the tread and possibly the rear wheel, the bearing surface of the rear wheel, in the high position, being tangent to the bearing surface defined by the tread, so as to cooperate with the movement for crossing the first steps of the staircase.

14. The powered wheeled vehicle according to claim 1, wherein the aforesaid controller is further designed so as to carry out, in forward gear, a transition between the last step of a staircase and the ground, upon moving down a staircase, including the following steps:

having the tread rest on the horizontal ground, having the rear wheel rest on the horizontal plane corresponding to the upper surface of the last step and then of the horizontal ground, lowering the front wheel so as to rest on the horizontal ground, stopping the drive of the tread, starting the rear wheel, the rear wheel, in the high position, resting on the edge of the last step and then gradually coming to rest on the ground, so as to cooperate with the movement for crossing the last steps of the staircase.

15. The powered wheeled vehicle according to claim 1, wherein the aforesaid controller is further designed so as to carry out, in forward gear, a transition between the uphill ground and the downhill ground of said obstacle, upon crossing a low height obstacle, including the following steps:

positioning of the vehicle at the obstacle, upward motion of the front wheel, having the tread rest on the horizontal ground, uphill from the obstacle, driving the tread, crossing the obstacle by means of the driveability of the tread, having the tread rest on the horizontal ground, downhill from the obstacle, having the rear wheel rest on the horizontal ground, downhill from the obstacle, lowering the front wheel so as to rest on the horizontal ground downhill from the obstacle, stopping the drive of the tread, starting the rear wheel, the rear wheel, in the low position, resting on the horizontal ground, uphill from the obstacle, and then gradually coming to rest on the horizontal ground, downhill from the obstacle, so as to cooperate with the movement for crossing the obstacle.

* * * * *

UNITED STATES PATENT AND TRADEMARK OFFICE
CERTIFICATE OF CORRECTION

PATENT NO. : 7,384,046 B2
APPLICATION NO. : 10/559077
DATED : June 10, 2008
INVENTOR(S) : Herve Le Masne De Chermont Page 1 of 1

It is certified that error appears in the above-identified patent and that said Letters Patent is hereby corrected as shown below:

Title page, item (73) Assignee, delete "HMCZDEVELOPPEMENT, Saint German en Laye (FR)". and insert --HMC2DEVELOPPEMENT, Saint Germain en Laye (FR)--.

Signed and Sealed this
Twenty-ninth Day of May, 2012

David J. Kappos
*Director of the United States Patent and Trademark Office*